United States Patent [19]
Collard et al.

[11] Patent Number: 5,323,693
[45] Date of Patent: Jun. 28, 1994

[54] COMBINATION FRYING PAN INSERT AND FRYING PAN

[75] Inventors: James C. Collard, Two Rivers; Larry W. Schiffer, Manitowoc, both of Wis.

[73] Assignee: Anchor Hocking Corporation, Freeport, Ill.

[21] Appl. No.: 36,760

[22] Filed: Mar. 25, 1993

[51] Int. Cl.⁵ ............................................. A47J 37/10
[52] U.S. Cl. ................................. 99/425; 99/445; 99/415
[58] Field of Search ............... 99/425, 422, 375, 400, 99/445, 415, 418; 126/390

[56] References Cited

U.S. PATENT DOCUMENTS

| | | | |
|---|---|---|---|
| 175,067 | 7/1875 | Gates . | |
| 403,407 | 5/1889 | Armour | 99/425 |
| 717,655 | 1/1903 | Astle . | |
| 1,356,432 | 10/1020 | Eidt . | |
| 1,733,450 | 10/1929 | Detwiler . | |
| 2,042,773 | 6/1936 | Feldman | 99/425 |
| 2,229,518 | 1/1941 | Parker | 99/425 |
| 2,321,676 | 6/1943 | Hennessy | 99/425 |
| 3,332,113 | 5/1967 | Simjian | 126/390 |
| 3,427,957 | 2/1969 | O'Reilly | 99/446 |
| 3,469,524 | 9/1969 | Trozzolo | 99/425 |
| 3,837,330 | 9/1974 | Lanigan et al. | 126/246 |
| 3,847,068 | 11/1974 | Beer et al. | 99/425 |
| 3,908,534 | 9/1975 | Martin | 99/418 |
| 3,988,975 | 11/1976 | Buter | 99/415 |
| 5,078,050 | 1/1992 | Smith | 99/483 |

FOREIGN PATENT DOCUMENTS

| | | | |
|---|---|---|---|
| 221348 | 5/1959 | Australia | 99/425 |
| 0214439 | 3/1987 | European Pat. Off. | 99/425 |

*Primary Examiner*—Stephen F. Gerrity
*Assistant Examiner*—Reginald L. Alexander
*Attorney, Agent, or Firm*—Baker & McKenzie

[57] ABSTRACT

An improved cooking device is provided for fat-free or low-fat frying of foods. A combination frying pan and removable insert allows the drainage of excess fat without interruption of the cooking operation. Fat is collected on the convex cooking surface of the insert and drains radially outward toward apertures disposed above a grease reservoir located in the outer bottom periphery of the frying pan. The insert overlies the reservoir and may be easily removed and replaced during the cooking operation. The pan fits over standard size electric burners.

5 Claims, 3 Drawing Sheets

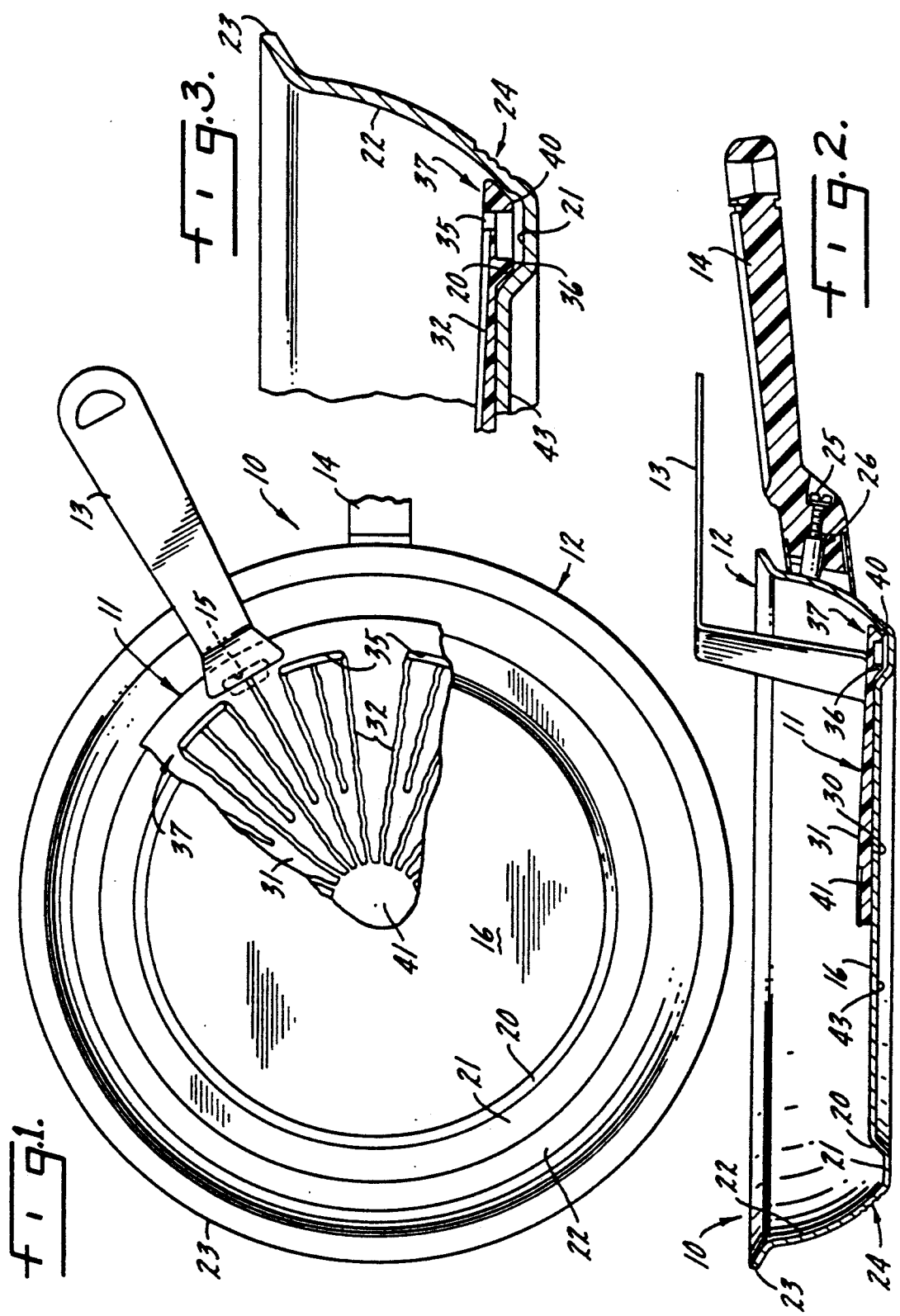

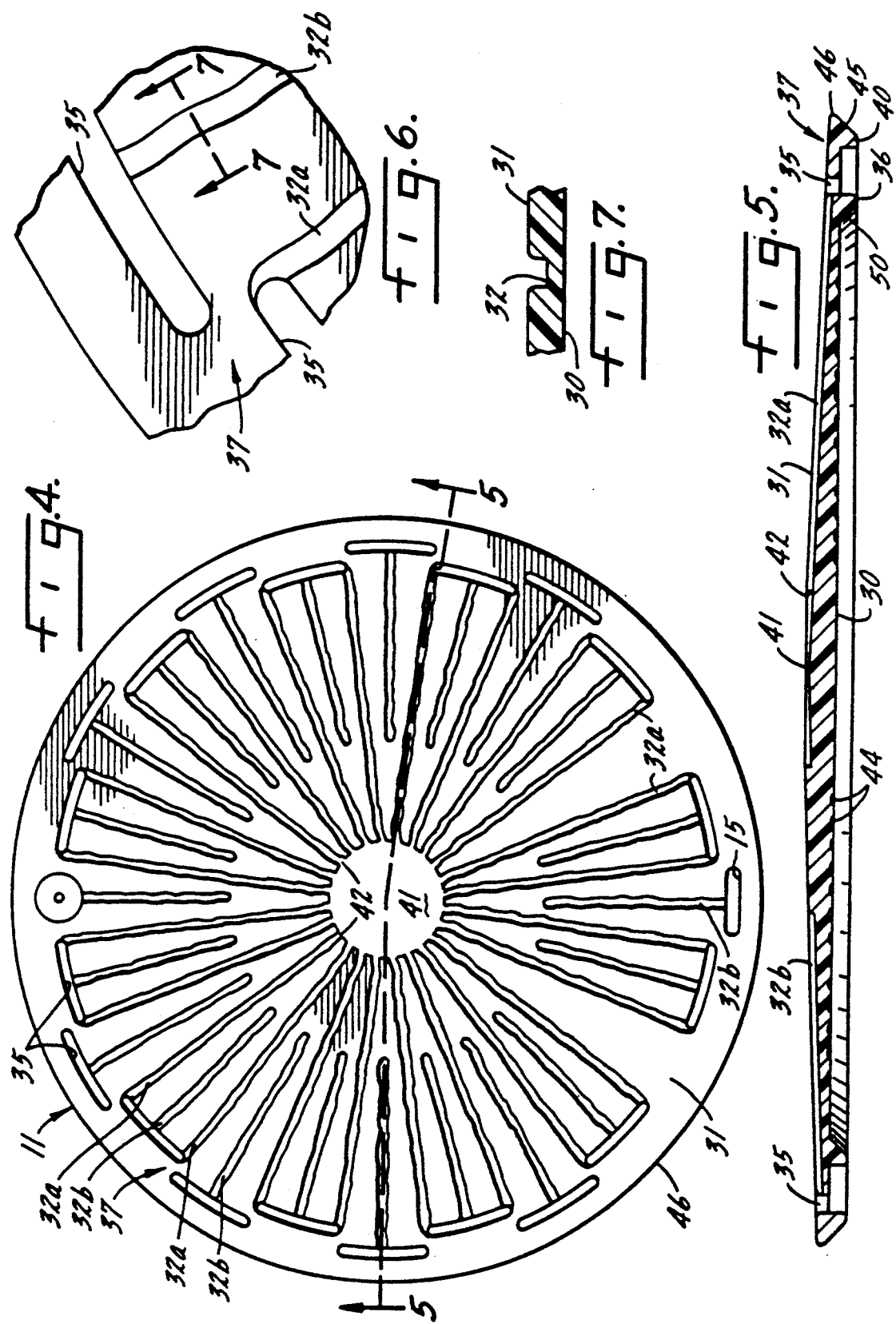

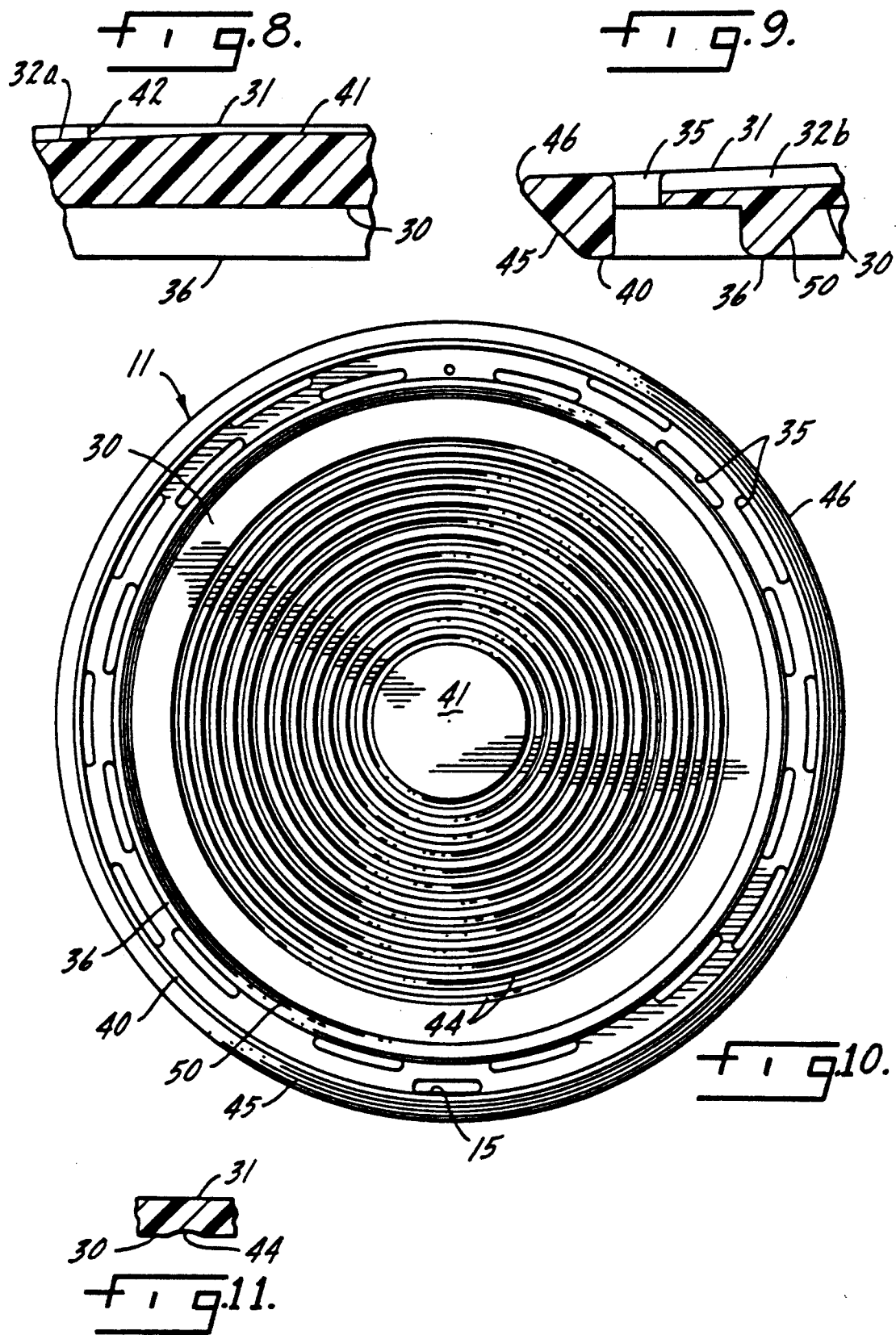

COMBINATION FRYING PAN INSERT AND FRYING PAN

FIELD OF THE INVENTION

This invention relates generally to a frying pan insert for use in combination with a specially designed frying pan to provide a cooking surface which effectively drains grease away from the frying food. More particularly, the invention relates to an insert with a convex cooking surface that fits over an upraised bottom surface of a frying pan. Grease drains away from the food along drainage channels and is deposited in a grease reservoir disposed in the outer periphery of the pan.

BACKGROUND OF THE INVENTION

In wake of the public awareness over the dangers of cholesterol and high fat diets, there has been a trend to lowering the amount of fat in one's diet. However, despite this trend, people of all cultures and all ethnic groups enjoy and will continue to enjoy numerous varieties of pan-fried foods. The specific problem addressed by the present invention, and not satisfactorily addressed by the prior art, is a means for cooking low-fat or non-fat fried foods. More particularly, no current commercially available frying device allows the cook to simultaneously fry the food and drain the grease away from the food that is being cooked.

Several attempts have been made at designing a low-fat or fat-free frying pan. These designs normally constitute a single piece of cookware. The frying pan may include an upraised central portion with a grease reservoir surrounding the upraised central portion and disposed between the upraised central portion and the outer wall of the pan. Grooves, channels or grids may be provided to drain the grease from the upraised portion into the grease reservoir.

The above design scheme suffers from two common problems. First, the grease reservoir is not sufficiently isolated from the food. The pan is normally intended to be placed on top of an electric burner, the electric burner being disposed below the upraised central portion and the reservoir being disposed around the electric burner. Because of the close proximity between the reservoir and the burner, the grease becomes hot as it is collected in the reservoir and has a tendency to splatter upward on both the food and the cook. Second, there is no way to drain excess grease from the reservoir as it accumulates without interrupting the cooking operation. If the cook tilts the pan to pour the grease out of the reservoir while the food remains disposed on top of the upraised central portion, the cook risks losing some of the food or the cook may damage the food by attempting to firmly hold it in place with a spatula as the pan is tilted to pour out the excess grease.

Another approach to providing a low-fat frying device is to provide an insert for placement inside a conventional frying pan. The food is cooked on the insert and the grease drains off the insert or through the insert and is collected in the frying pan disposed below. Two problems are associated with this design scheme. First, the inserts are not removable and therefore the cook cannot easily lift the insert out of the pan during the cooking operation to drain excess grease from the pan. Second, the inserts do not effectively isolate the food from the grease and the hot grease disposed immediately below the insert splatters upward through the insert and on to the food. Most of the inserts are not designed to isolate the food from the splattering grease but merely serve as a means to facilitate the drainage of excess grease after the cooking operation is completed. This process is not considered to be a low-fat cooking scheme because the food remains coated with grease during the entire cooking operation.

Thus, there is a need for an improved frying pan insert and also for an improved combination frying pan/frying pan insert that allows for low-fat or even fat-free cooking. The insert should have an improved means for draining grease away from the food during the cooking operation and further an improved means for isolating the accumulated grease from the food. The insert should also be easily removed from the frying pan during cooking so that excess grease can be removed from the grease reservoir or reservoir without significantly interrupting the cooking operation. Finally, there is a need for a frying pan insert/frying pan combination that provides a safe and effective means for low-fat frying whereby the grease is separated and isolated from the frying food and further is not permitted to splatter upward back onto the food or toward the cook.

BRIEF DESCRIPTION OF THE INVENTION

The present invention makes a significant contribution to the low-fat cookware art by providing an improved insert for use with a specially designed frying pan. The insert acts to effectively drain grease away from the food as it cooks. The insert and pan are designed together so that the grease is drained away from the food and the insert and pan act to isolate the grease from the food and prevent upward splatter toward the food and/or the cook. Further, the cook may safely remove excess grease from the pan without interrupting the cooking operation.

The pan of the present invention includes an upraised bottom surface with a grease reservoir disposed around the upraised bottom surface between the upraised bottom surface and the upwardly protruding outer wall of the pan. The bottom surface of the grease reservoir is disposed vertically below the upraised bottom surface. The undersurface of the upraised bottom surface provides a round detent in the bottom of the pan and, in the preferred embodiment, this round detent fits over a standard-sized electric burner for effective heat transfer.

An insert is provided with a convex upper surface for cooking the food. The underside of the insert is configured to fit snugly over the upraised bottom surface of the pan. The convex upper surface includes a plurality of drain channels that effectively drain the grease away from the food in radially outward directions. The drain channels terminate in a series of apertures disposed toward the outer periphery of the insert. The apertures provide fluid communication between the drain channels and the grease reservoir of the pan disposed therebelow.

The insert extends radially outward beyond the upraised portion of the pan to substantially cover the reservoir disposed therebelow. Therefore, with the exception of the apertures, the insert covers the reservoir and substantially precludes any upward splattering of the hot grease during the cooking operation. To assist in this regard, the preferred embodiment of the insert includes an inner peripheral leg disposed around the upraised bottom surface of the pan and an outer peripheral leg disposed around the outer periphery of the insert and adjacent to the upwardly protruding outer wall of the pan. The two legs act to further contain any splattered grease within the reservoir and to provide a mateable engagement between the insert and pan.

The insert also includes a slot for accommodating a handle so that the insert is easily grasped and lifted out of the pan during the cooking operation. After the insert is grasped and lifted, the cook may easily pour excess grease out of the reservoir and thereafter replace the insert and pan over the burner to resume cooking. The insert handle may then be easily removed from the insert so that it does not get in the way of the cook during the cooking operation.

It is therefore and object of the present invention to provide an improved frying pan insert/frying pan combination for low-fat or fat-free cooking of food.

It is also an object of the present invention to provide an improved insert for use with a frying pan, the insert providing effective drainage of grease from the food during cooking.

Yet another object of the present invention is to provide a frying pan insert and frying pan combination that effectively isolates the drained grease from the food during cooking and further prevents any upward splatter of the grease during cooking.

Yet another object of the present invention is to provide an improved frying pan insert that may be easily removed from the frying pan during cooking so that the cook may drain excess grease from the pan without substantially interrupting the cooking operation.

BRIEF DESCRIPTION OF THE DRAWINGS

This invention is illustrated more or less diagrammatically in the accompanying drawings, wherein:

FIG. 1 is a partial top plan view of a frying pan and a partial top plan view of a frying pan insert made in accordance with the present invention;

FIG. 2 is a side sectional view of the frying pan insert/frying pan combination shown in FIG. 1;

FIG. 3 is a partial side sectional view of the frying pan insert/frying pan combination shown in FIG. 1;

FIG. 4 is a top plan view of the frying pan insert shown in FIG. 1;

FIG. 5 is a sectional view taken substantially along line 5—5 shown in FIG. 4;

FIG. 6 is a partial top plan view of the frying pan insert shown in FIG. 4, particularly illustrating the apertures and drainage channels;

FIG. 7 is a sectional view taken substantially along line 7—7 shown in FIG. 6;

FIG. 8 is a partial side sectional view of the insert shown in FIG. 4, particularly illustrating the recessed middle portion and the inner end of a drainage channel;

FIG. 9 is an enlarged side sectional view of the outer periphery of the insert as shown in FIG. 5;

FIG. 10 is a bottom plan view of the insert shown in FIG. 4; and

FIG. 11 is an enlarged side sectional view of the insert shown in FIG. 10, particularly illustrating the grooves disposed in the underside of the insert.

DETAILED DESCRIPTION OF THE INVENTION

Like reference numerals will be used to refer to like or similar parts from figure to figure in the following description of the drawings.

The dramatic improvement contributed by the present invention is best understood after consideration of how conventional low-fat or fat-free frying pans work. Normally, food is cooked on an upraised cooking surface and grease drains down through channels and is deposited into a reservoir disposed in the outer periphery of the pan. Hot grease collected in the reservoir is further heated and is free to splatter upward toward the cooking food and toward the cook. Inserts have previously been used but the inserts known in the art do not adequately isolate the food from the grease or are not easily removable during the cooking operation so that the cook may remove excess grease from the pan. The present invention overcomes these problems and provides an improved insert for effectively draining and isolating grease away from food as it cooks, collecting the grease in a reservoir disposed in the under periphery of the pan and further covering the reservoir so that grease may not splatter upward toward the cook or the food. The insert is easily removable from the pan during cooking so that excess grease may be removed without substantially interrupting the cooking operation.

As seen in FIGS. 1 and 2, the combination frying pan/ insert 10 includes a frying pan insert 11 and a frying pan 12. Both the insert 11 and the pan 12 are equipped with handles 13, 14. The handle 13 is attached to the insert 11 by inserting a tongue (not shown) into the slot 15. The handle may also be easily removed from the insert 11 by lifting the handle 13 and the tongue (not shown) out of the slot 15. By equipping the insert 11 with an easy-to-remove/easy-to-insert handle 13, the insert 11 may be grasped and lifted out of the pan 12 during the cooking operation so that the cook can easily remove excess grease from the pan 12.

Turning to FIG. 2, the pan 12 includes an upraised bottom surface 16 which extends radially outward to a downwardly sloping inner wall 20. The wall 20 connects the upraised bottom surface 16 to the grease reservoir 21. The reservoir 21 extends radially outward to the upwardly protruding outer wall 22 which terminates at an outwardly protruding lip 23. The grooves indicated at 24 are ornamental in nature. The handle 14 is attached to the pan 12 via a screw 25 and a mounting bracket 26 which is welded or otherwise fixedly attached to the outer wall 22.

Referring to FIGS. 1, 2 and 3 collectively, the insert 11 includes an undersurface 30 for engaging the upraised bottom surface 16 of the pan. The insert 11 also includes a convex cooking surface 31 (also shown in FIG. 5) which facilitates the draining of grease away from food as it cooks on top of the convex cooking surface 31. A plurality of drain channels, indicated generally at 32, provide a path for the grease to drain radially outward toward the apertures 35 disposed in the outer periphery 37 of the insert 11. As seen in FIG. 3, the apertures 35 provide fluid communication between the drain channels 32 and the reservoir 21. As food is cooked on the convex cooking surface 31, grease travels down the drain channels 32 and through the apertures 35 and is isolated from the food in the reservoir 21. Hot grease is maintained in the reservoir 21 and is prevented from splattering upward back onto the food or towards the cook by the inner peripheral leg 36 and outer peripheral leg 40. As seen in FIGS. 1 and 3, the outer periphery 37 of the insert 11, which includes the inner leg 36 and the outer leg 40, acts as a circular lid for the reservoir 21.

Turning to FIG. 4, the insert 11 includes two basic types of drain channels 32a, 32b. The drain channels 32a extend radially outward from a central portion 41 of the insert 11 and terminate at an aperture 35. The drain channels 32b extend radially outward from a middle portion of the insert 11 and terminate at an aperture 35. The apertures 35 provide fluid communication between the convex cooking surface 31 and the reservoir 21.

The aperture or slot 15 also provides a means of communication between a drain channel 32b and the reservoir 21 (see FIG. 2) and it also serves as a means for attaching the handle 13 to the insert 11 so that the insert 11 can be removed from the pan 12 while the food is cooking. With the insert 11 temporarily removed from the pan 12, the cook may remove excess grease from the reservoir 21 and the pan 12 during cooking and quickly replace the food and insert 11 back into the pan 12 to resume the cooking operation.

Referring to FIG. 5, the convex cooking surface 31 includes a recessed middle portion 41 which communicates with the inner ends 42 of the drain channels 32a. Melted grease and juices flow from the central portion 41 radially outward through the drainage channels 32a and then finally down through the apertures 35 and into the reservoir 21 disposed therebelow (see FIG. 3). The inner peripheral leg 36 extends around and is disposed adjacent to the inner wall 20 of the pan 12. The close physical contact between the undersurface 30 of the insert 11 and the upraised bottom surface 16 of the pan 12 allows for efficient heat transfer between the upraised bottom surface 16 and the insert 11. The outer peripheral leg 40 extends around and maintains close contact with the upwardly protruding outer wall 22 of the pan 12. The close fit of the insert 11 into the bottom of the pan 12 provides efficient heat transfer between the burner (not shown) and the upraised undersurface 43 of the pan 12 (see FIG. 2) which accommodates the burner. The upraised undersurface 43 is specifically sized to accommodate standard sized electric burners. The concentric grooves, indicated generally at 44, disposed in the underside 30 of the insert 11 aid in the transfer of heat between the underside 30 of the insert 11 and the upraised bottom surface 16 of the pan 12.

Turning to FIGS. 6 and 7, the drain channels 32a, 32b terminate in the apertures 35 and molten grease easily flows from the drain channels 32a, 32b down through the apertures 35 to the reservoir 21 (see FIG. 3) disposed therebelow. The depth of the channels 32 should be deep enough to accommodate substantial flow of grease, which would result during the cooking of high fat foods, such as bacon.

Turning to FIG. 8, the fluid communication between the central portion 41, the inner end 42 of a drain channel 32a and a drain channel 32a is illustrated. Turning to FIG. 9, the angle of the outer peripheral edge 46 should coincide with the lower angle of the upwardly protruding wall 22 of the pan 12. The outer peripheral surface 45 connects the outer peripheral leg 40 to the outer peripheral edge 46 of the insert 11. The inner peripheral surface 50, which connects the inner peripheral leg 36 to the undersurface 30, should coincide approximately with the inner wall 20 of the pan 12 (see FIG. 2).

FIG. 10 is an illustration of the underside 30 of the insert 11. A key feature of the underside 30 is the series of concentric grooves indicated generally at 44. As noted above, the grooves 44 aid in the transfer of heat between the upraised bottom surface 16 of the pan 12 and the undersurface 30 of the insert 11. An example concentric groove 44 is illustrated in FIG. 11.

In operation, the handle 13 is inserted into the slot 15 so that the insert 11 may be placed over the upraised bottom surface 16 of the pan 12. Heat is applied via an electric burner disposed within the upraised undersurface 43 of the pan 12 and the food is placed on the convex cooking surface 31 of the insert 11. As the food cooks, melted grease will flow into the central portion 41 and into the drain channels 32a and 32b of the insert 11. Because the cooking surface 31 is convex, the grease will flow, under the force of gravity, radially outward towards the apertures 35. The grease flows down through the apertures 35 and is deposited and retained within the reservoir 21. If excess grease is accumulated in the reservoir 21 during the cooking operation, the cook has the option of inserting the handle 13 into the slot 15 and raising the food and the insert 11 above the pan 12. Then, the cook may pour the grease out of the pan 12 and the reservoir 21, place the pan 12 back over the burner and replace the insert 11 and food over the upraised bottom surface 16 of the pan 12. The cooking operation will then be resumed without risking spillage or damage to the food.

Although only one preferred embodiment of the present invention has been illustrated and described, it will at once be apparent to those skilled in the art that variations may be made within the spirit and scope of the present invention. Accordingly, it is intended that the scope of the invention be limited solely by the scope of the hereafter appended claims and not by any specific wording in the foregoing description.

We claim:

1. Cookware for frying food and draining grease from the food during frying while eliminating grease splatter and optimizing heat transference from a heat source to the food during frying, the cookware comprising:

a pan, said pan having a solid bottom structure which blends into an upstanding enclosing wall, said bottom structure having a peripheral channel forward between a main, center portion of said bottom structure and said enclosing wall, said main, central portion of said bottom structure being elevated with respect to said peripheral channel and extending radially outwardly from the center of said cookware to nearly a side wall, said peripheral channel being located in a radial distance between an outer edge portion of said main central portion and said enclosing wall, said bottom structure, including said peripheral channel, and said enclosing wall being integrally constructed so as to form a fluid tight container, an insert, said insert disposed on an elevated upper surface of said main central portion of said bottom structure of pan and extending radially outwardly so as to at least substantially overlie said peripheral channel, said insert having an upper, food contacting surface, substantially the entire bottom surface of said insert being in abutting, maximum heat transference contact with the upper surface of said main central portion of said bottom structure, said insert having a plurality of upwardly open drain channels extending outwardly from an internal region thereof, said drain channels directly communicating, via apertures which extend through said insert, with said peripheral channel in said bottom structure, that portion of said insert overlying said peripheral channel forming a barrier which substantially entirely prevents drained grease and fat in said peripheral channel from splattering upwardly.

2. The device of claim 1,
wherein said drain channels are formed in said upper, food contacting surface only of said insert.

3. The device of claim 1,
wherein said elevated upper surface of main central portion of said bottom structure is flat.

4. The device of claim 1,
wherein said bottom surface of said main central portion of said bottom surface is flat and has a diameter large enough to enable said main central portion of said bottom structure to make abutting, maximum heat transference contact with a heat source such as an electric burner.

5. The device of claim 1,
wherein said upper food contacting surface of said insert is convex whereby said drain channels slope radially downwardly to said apertures so as to direct grease and fluids generated during the cooking process to, and through, said apertures and into said peripheral channel.

* * * * *